J. H. HART.
HORSE AND MULE COLLAR.
APPLICATION FILED MAR. 4, 1912.
1,051,104. Patented Jan. 21, 1913.
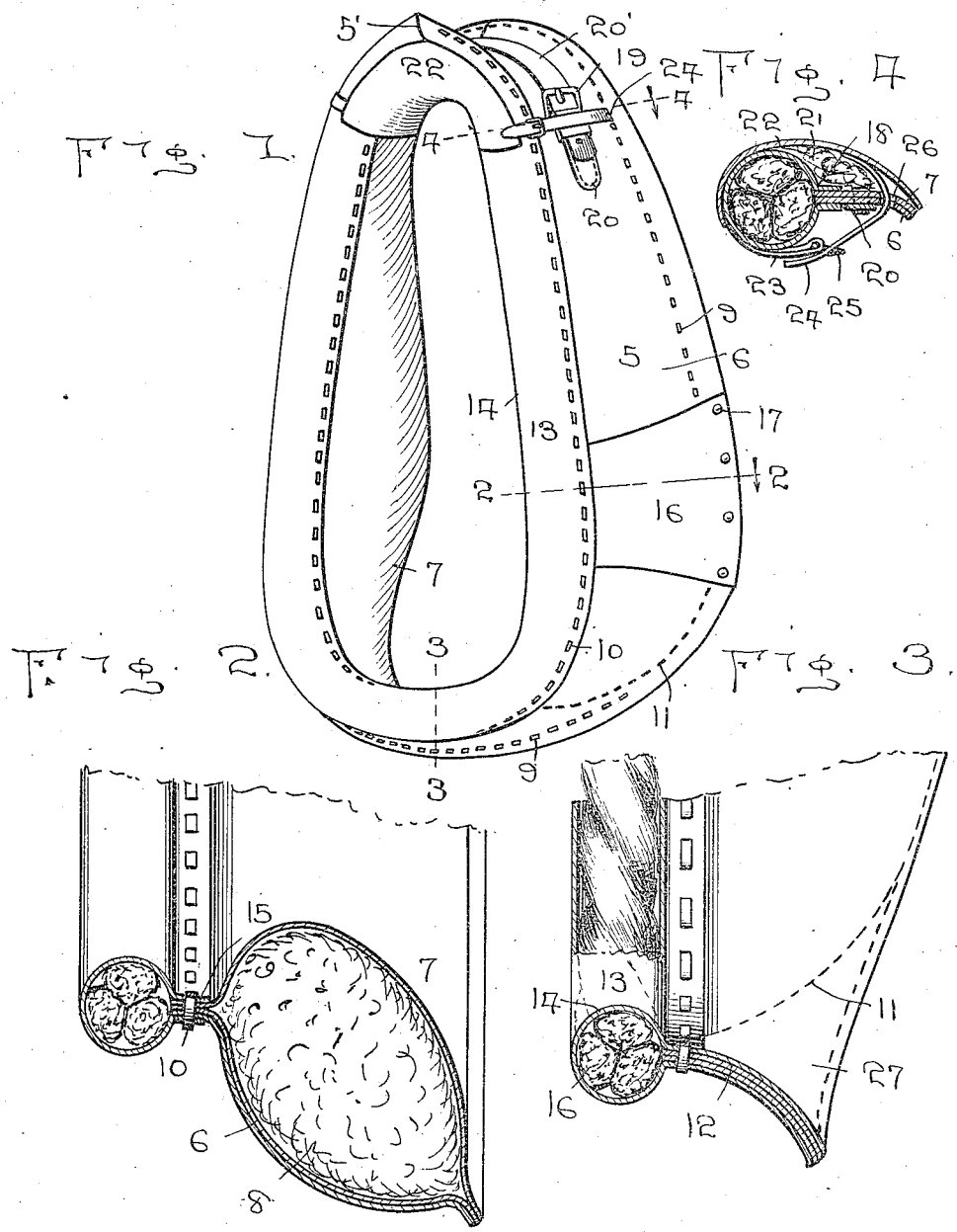

UNITED STATES PATENT OFFICE.

JOHN H. HART, OF MEMPHIS, TENNESSEE.

HORSE AND MULE COLLAR.

1,051,104.  Specification of Letters Patent.  Patented Jan. 21, 1913.

Application filed March 4, 1912. Serial No. 681,334.

*To all whom it may concern:*

Be it known that I, JOHN H. HART, a citizen of the United States, residing at Memphis, in the county of Shelby and State of Tennessee, have invented certain new and useful Improvements in Horse and Mule Collars; and I do hereby declare the following to be a full, clear, and exact description of the invention, such as will enable others skilled in the art to which it appertans to make and use the same.

This invention relates to horse-collars, and it more particularly relates to certain details of construction with reference to filling and padding of horse-collars.

An object of the invention is to apply the covering or casing over the filling in a novel and particularly useful manner.

Another object of the invention is to arrange the filling in such relation as to provide a depression in which a thick soft neck-protecting pad may be seated and retained.

A still further object of the invention is to provide simple and efficient means, in proximity to the depression, for positively securing the pad in proper position.

Further objects and advantages will be hereinafter set forth and pointed out in the specification and claim.
In the accompanying drawings which form a part of this application, Figure 1 is a perspective view in elevation of the complete horse collar embodying my invention. Fig. 2 is a fragmental sectional view, on the line 2—2 of Fig. 1. Fig. 3 is a fragmental sectional view on the line 3—3 of Fig. 1, and, Fig. 4 is a sectional view on the line 4—4 of Fig. 1.

Referring more particularly to the drawings in which similar reference characters designate corresponding parts throughout the several views, the main body or rear wale of the collar is represented generally by the numeral 5, consisting of a front covering 6, a rear covering 7 and a filling 8. The outer edges of the outer covering and inner covering are brought together and secured preferably by stitching as at 9, the inner edges being similarly brought together and stitched as at 10.

The filling 8 does not extend from one side of the collar to the other, but the filling of each side is caused to terminate at its bottom portion by means of a seam 11, and below this seam, the filling may be replaced by reinforcing pieces of leather or other suitable material 12. The filling 8 terminates at a point near the top of the collar, so that a depression is formed at the point where the filling terminates and the front and rear covering are brought into contact with each other. This depression is made more pronounced by the proximity of the front wale or rim 13 which consists of a covering 14, having flanges 15, and inclosing a filling 16. This filling consists of rope, which may be of any ordinary construction or material, but is preferably made from a soft, pliable and strong fiber, such as hemp, cotton, jute or the like, or may be made from any of the various straws or grasses, moss or wood fiber; but instead of being applied in parallel lengths, as is usual in horse-collar construction, I form the fiber or like material into strands, and twist the strands into the form of a rope. It may be desirable in constructing horse collars, for certain purposes, to use the rope formed of many tightly twisted strands, so as to form a substantially cylindrical and comparatively solid filling for the covering 13, but I prefer, for the sake of economy and general utility to provide a rope of this character consisting of a few comparatively soft strands, so that said rope may be compressed, by any suitable means, into substantially cylindrical form; and the same may then either be inserted in the covering 14, or the covering 13 may be applied and formed around the rope.

The rim and body are preferably united in the manner illustrated in the drawings, the flanges 15 overlapping the inner edges of the coverings 6 and 7 of the body, but this detail of construction may be varied to suit particular circumstances, without departing from the spirit of the invention.

Along the seam 10, by which the body 5 and rim 13 are united, is a channel or valley adapted to receive the usual hames, applied in the ordinary manner, and since hames of ordinary construction are usually provided with hooks or the like, which tend to wear the collar by the contact of said hooks, etc., I have provided the hame-chafes 16, preferably secured to the body and the rim 13 by means of the stitching 10, an edge of said hame-chafe extending under the covering 14. The outer edge of the hame-chafe extends over and protects the stitching 9, and is secured to the edge of the covering 6, beyond the stitching 9, by means of rivets 17.

As previously stated, the filling 8 terminates at a point near the top of the body 5, and the under and rear surface of the collar is depressed as at 18, the rear covering 7 and front covering 6 being secured together in parallel relation, and immediately above the termination of the filling 8, a buckle 19 is secured to the front covering and the inner covering by stitching, rivets or other proper means as indicated at 20. The advantage of this construction is obvious, because of the fact that in case a buckle, or the strap holding it, should break, the same could easily be replaced by an ordinary workman and not requiring skill or intricate tools, as would be the case if the fastening means 20 extended through the filling. A billet-strap 20' is similarly secured to the side of the collar opposite to the strap 20, and is adapted to coact with the buckle 19 for securing the two sides of the collar in closed position, the said sides meeting and contacting with each other at 5'. Another important feature in connection with this depressed portion 18 consists in the provision of a seat for the neck-protecting pad; this pad consisting of a fiber filling 21, fitting in the depression 18, and the covering 22, which extends under the filling 21; the covering 7 and the wale 13, partly surrounding the latter. Straps 23 and 24 respectively are secured adjacent to opposite edges of the covering 22 and are united by a buckle 25, for securing the protecting pad to the body of the collar. The coverings 6 and 7 are apertured at 26 to permit the strap 24 to be passed therethrough. By making the pad 21 separate or separable from the pad 22, either one of these elements may be renewed, when desired, without necessitating the expense of renewing both parts. The several advantages of this construction will be obvious to those familiar with the art.

My invention is not limited by the exact details of construction, combination and arrangement of parts, as shown and described in the foregoing; but my invention is limited only by a reasonable interpretation of the following claim.

What I claim is:

In a horse collar, a front wale comprising a covering and a filling extending throughout the covering, a rear wale comprising a filling and a covering, the filling of the rear wale terminating near the upper end of the collar and the front part of the covering being brought into contact with the rear part thereof so as to form a depression at the junction of the filled front wale and the non-filled portion of the rear wale, said rear wale having apertures therethrough adjacent to the depressed portion, a protecting pad fitted into the depressed portion and having straps secured thereon, said straps extending through the apertures for securing the pad substantially in fixed relation to the body of the collar.

In testimony whereof I have signed my name to this specification in the presence of two subscribing witnesses.

JOHN H. HART.

Witnesses:
BEN F. WOLF,
EVERET STELLEGER.

---

Copies of this patent may be obtained for five cents each, by addressing the "Commissioner of Patents, Washington, D. C."